Patented May 2, 1950

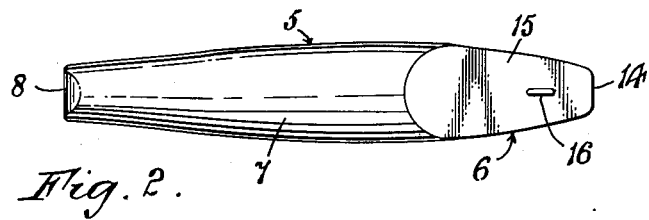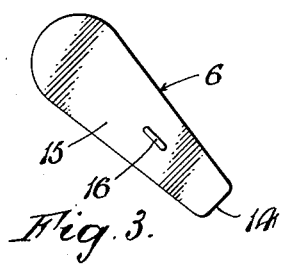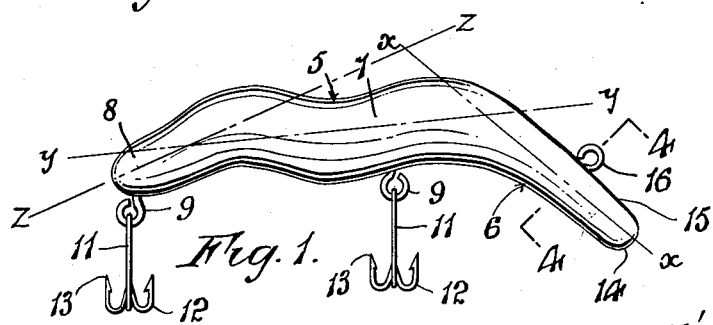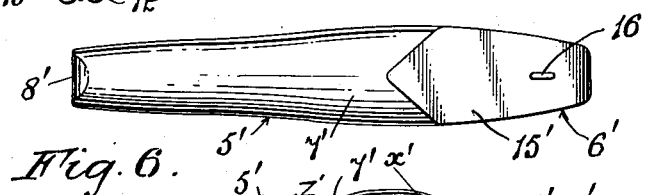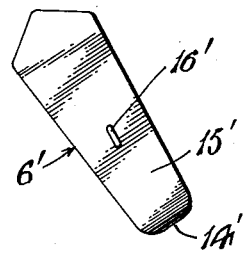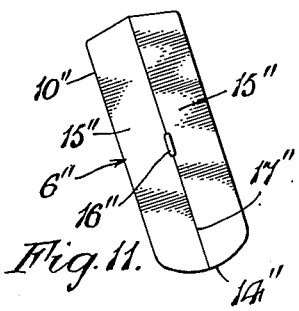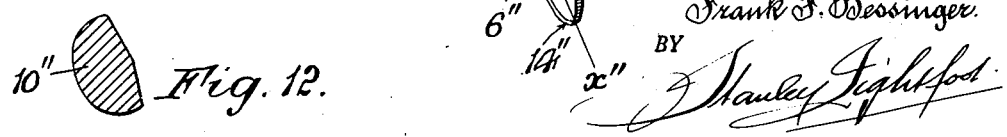

2,506,263

UNITED STATES PATENT OFFICE 2,506,263

FISH LURE

Frank F. Bessinger, Detroit, Mich.

Application January 7, 1946, Serial No. 639,508

3 Claims. (Cl. 43—42.48)

The present invention, relates to improvements in artificial fish lures, and more particularly to a fish lure adapted for trolling as well as still fishing.

The primary object of the invention, is to provide an artificial fish lure as bait which is so constructed, shaped and formed as to increase the fish-getting qualities thereof, and to provide an artificial lure which when drawn through the water will simulate a live bait or lure.

Another object of the invention, is to provide an artificial fish lure in which the body portion is provided with an angularly disposed downwardly directed head formed in such a manner as to cause the fish lure to dive to a pre-determined depth when drawn through the water at a slow trolling speed.

Another object of the invention, is to provide an artificial fish lure of the above mentioned character in which the body portion is of a serpentine form in a vertical plane so that the fish lure will travel along a zig-zag path when it is drawn through the water.

Another object of the invention, is to provide a fish lure of the above mentioned type in which the angularly disposed head is provided with a relatively flat inclined wall surface presented in the direction of fish lure travel, whereby said inclined surface will form a plane surface to cause said fish lure to be submerged in a pre-determined depth when drawn through the water.

Another object of the invention, is to provide an artificial fish lure of the above mentioned type in which the nose or plane surface on the head portion is of a length greater than one half the length of the body portion, so that the plane surface will be comparatively large and thereby cause the same to be submerged to a pre-determined depth when the lure is drawn through the water at a relatively slow trolling speed.

Another object of the invention, is to provide an artificial fish lure in which the fish line is affixed to the nose or head portion a considerable distance from the forward end of the fish lure, in order that the same may be rendered more sensitive to various speeds and produce a unique movement while being drawn through the water.

Another object of the invention, is to provide an artificial fish lure or bait with a series of spaced apart fish hooks, secured to the front and rear portions of the fish lure body and affixed thereto in straight line registry with the trolling or fish line point of attachment. This arrangement prevents fouling of the line when a fish strikes or takes one of the fish hooks as the fish lure body is not thrown out of line when a large load force is imposed on the trolling or fishing line.

Other objects and advantages of the invention will become apparent during the course of the following description of the accompanying drawing, wherein:

Figure 1 is a side elevational view of the fish lure embodying the invention and showing one form of the artificial fish lure or bait;

Figure 2 is a top elevational view of the fish lure showing the relatively flat surface on the head portion to form a diving plane for the fish lure;

Figure 3 is a plan view of the flat plane surface of the fish lure head portion, showing the exact shape thereof;

Figure 4 is a transverse cross-sectional view of the head portion of the artificial fish lure, taken on line 4—4 of Figure 1 and illustrating the cross-sectional shape of the fish lure head portion;

Figure 5 is a side elevational view of a slightly modified form of the invention, illustrating the nose or body portion of the fish lure or bait extending at a greater angle to the body portion, whereby said artificial bait will submerge a smaller distance from the surface of the water when drawn therethrough;

Figure 6 is a top elevational view of the artificial fish lure or bait shown in Figure 5, illustrating the flat plane surface of the head portion of the artificial bait and the general outline thereof;

Figure 7 is a top plan view of the flat plane surface of said head portion, further showing the outline thereof and the location of the fish line attaching eye;

Figure 8 is a transverse cross-sectional view of the form of the invention shown in Figures 5, 6 and 7, taken on line 8—8 of Figure 5 and showing the cross-sectional shape of the head portion of said artificial lure or bait;

Figure 9 is a side elevational view of a still further modified form of the invention, showing the head portion extending at a greater angle to the body portion of the artificial bait or lure so that the lure will travel through the water a slight distance from the surface thereof;

Figure 10 is a top elevational view of the form of the invention shown in Figure 9 showing the head portion of slightly increased width and the inclined flat plane surface formed by converging flat wall surfaces meeting along the central portion of said angularly disposed head;

Figure 11 is a top plan view of the inclined plane surface formed on the head portion of the artificial fish lure or bait shown in Figures 9 and 10 and illustrating the fish line receiving eye screw affixed to said plane surface intermediate the ends thereof; and Figure 12 is a transverse cross-sectional view taken on line 12—12 of Figure 9 and showing the configuration of the head portion in section.

In the drawings, attention is first directed to Figures 1 to 4 inclusive, wherein there is shown an artificial fish lure constructed in accordance with the present invention and designed for traveling through the water at a relatively great depth during trolling and fishing. In general, the artificial fish lure is comprised of a body portion 5 and a head portion 6 which may be formed of plastic material or any substance having buoyant characteristics. The body portion 5 is formed of a solid section 7 which tapers slightly from the forward end to the tail or rear end 8 and as shown in Figure 1 is of a serpentine form in a vertical plane to cause the artificial fish lure to travel in a zig-zag fashion when drawn through the water. The solid body portion 7 is of round or cylindrical sectional shape throughout the major portion of its length.

Affixed to the underside of the solid body section 7 is a pair of screw eyes 9, arranged in spaced apart relation and disposed one adjacent the front end of the body section, and one adjacent the rear end thereof. Multi-pronged fish hooks 10 have the upper ends of their shanks 11 supported by the screw eyes 9 so that the hook portions thereof as at 12 will be suspended in a well-known manner. The ends of the hook portions 12 terminate in the usual barbs 13.

The head portion 6 is integrated with the body portion 5 and extends downwardly (Fig. 1) in such a manner that the axis thereof $x—x$ intersects the axis $y—y$ of the body portion at an angle of approximately 40°, while the axis of the tail portion 8 as indicated by the line $z—z$ is at a still more acute angle to the axis $x—x$. As indicated in Figures 2 and 3, the head portion 6 tapers slightly from the body portion to the nose or extreme forward end of the fish lure as at 14. In section, the head portion is formed semi-round to provide a flattened but slightly curved face 15 presented in the direction of movement of the fish lure through the water so as to provide an oblique plane surface for the purpose of guiding the artificial fish lure to a substantial depth in the water, the surface 15 being of a length substantially greater than half the length of the body portion 5. A screw eyelet 16 is secured to the head portion 6 on the plane surface 15, substantially intermediate the ends thereof and at least spaced a considerable distance from the nose 14 of the head portion in direct alignment with the point of attachment of the fish hooks 11. It will be noted that the screw eyes 9 are in longitudinal alignment with the line attaching screw eye 16 so that when a fish is impaled on one of the hooks 12, a straight line pull will be exerted on the fish line at the point of its attachment or on the screw eye 16. Thus the body portion of the artificial fish lure will not be materially moved out of the path of its travel and will not cause the same to foul the fishing line or leaders.

In the modified form of the invention shown in Figures 6 to 8 inclusive, the fish lure is comprised of a body portion 5' and an integral head 6' and as is the case in Figures 1 to 4 inclusive also consists of a round body section 7' tapering slightly from the forward end to the rear end 8'. The body portion may be formed of a buoyant plastic composition capable of being molded to the required shape to provide a body portion of sinuous zig-zag shape (Fig. 5). Screw eyes 9' are affixed to the underside of the body portion for supporting conventional fish hooks 11' similar to the fish hooks 11 shown in Figures 1 to 4 inclusive.

The head 6' is of semi-round section and includes a solid extension 10' of the body portion 5' projecting therefrom at an angle slightly greater than the angularity of the head portion 6 with respect to the body portion 5 (Figures 1 to 4 inclusive). As noted in Figures 5, 6 and 7, the head portion 6' tapers slightly from the point of juncture with the body portion 5' to the nose or extreme forward end of the artificial fish lure or bait as at 14'.

The forward portion of the head 6' is formed relatively flat to provide a slightly curved plane surface 15' as viewed in side elevation, extending from the point of juncture of the head with the body portion 5' to the nose 14' and extending at least a slightly greater distance than half the length of the body portion 5'.

Secured intermediate the ends of the head portion and anchored to the solid extension 10' is a screw eye 16' to which the leader of a fish line may be affixed, the screw eye 16' being attached at a point remote from the nose 14' of the head portion so that the artificial fish lure will assume a correct position when being drawn through the water.

It is to be noted, that the axis of the head portion 6' as at $x'—x'$ extends at an angle with respect to the axis $y'—y'$ of the body portion 5' and forms an included angle therewith of approximately 53°. The tail portion 8' again lies on an axis $z'—z'$ at a still more acute angle to the axis $x'—x'$. Thus, the head portion 6' is angled slightly greater than the head 5 of Figures 1 to 4 inclusive and permits the artificial fish lure to be submerged a medium distance below the water level when being drawn through the water during fishing or trolling.

Also, it is to be noted that the fish hook attaching screw eyes 9' are in longitudinal alignment with the leader line screw eye 16' so that a straight line pull may be exerted from the line through the head and body portion of the artificial fish lure when a fish strikes and becomes impaled on one of the fish hooks.

In the modified form of the invention, as illustrated in Figures 9 to 12 inclusive, the artificial fish bait likewise includes a body portion 5" and a head portion 6" extending at an angle thereto. The body portion 5" is substantially identical in form to that shown and described in Figures 1 to 8 inclusive. The body portion is formed of a solid round section 7" tapering slightly from the forward end to the tail or rear end 8" and may be constructed of a suitable plastic composition capable of being molded to provide a sinuous body shape (Figure 9).

Secured to the underside of the body portion 5" is a pair of spaced apart screw eyes 9" from which is suspended the shanks 11" of the usual fish hooks (not shown).

The head portion 6" is formed of a solid angular extension 10" of round section which tapers slightly from the point of juncture with the body portion to the nose or extreme forward end as at 14". The forward portion of the artificial fish lure head 6" is shaped to provide a pair of plane surfaces 15" converging at a median point as at 17" (Figure 11). This structure produces a slight wobbling motion in a lateral direction when the artificial fish lure is being drawn through the water in addition to the vertical zig-zag motion produced by the sinuous-shaped body portion 5".

A screw eye 16" is secured to head 6" at the point of convergence of the plane surfaces 15" and is located intermediate the ends of the head portion remote from the nose 14", so that a pull force on a leader line attached thereto will be transmitted to the fish hooks through the artificial fish lure in a relatively straight line, thus preventing the lure from becoming entangled with the fish line and its leader line.

The head portion 6" extends at a greater angle with respect to the body portion 5" than the head portions 6 and 6' of the previously described forms of the invention, and it is intended to provide an angular relation between the head portion 6" and the body portion 5" such that the artificial fish lure will travel through the water at a very small depth and distance from the water surface. As illustrated in Figure 9, the axis $x''—x''$ of the head 6" makes an included angle with the axis $y''—y''$ of the body portion 5" of approximately 60°, and the axis of the tail portion 8" is shown by the line $z''—z''$ as being at a still more acute angle to the axis $x''—x''$. Thus, the greater the included angle between the axis of the head and the axis of the fish lure or bait body portion, the smaller will be the extent of submergence of the fish lure or bait below the surface of the water when the same is drawn therethrough. This effect is produced by the difference in the size of the body of the fish lure relative to the head or forward portion as well as the angularity of the head with respect to the body. The centroidal point being located rearwardly of the center and below the axis of the fish lure or bait body causes the body portion to submerge a greater distance than the head portion and as the angle of the head with respect to the body is increased, the head approaches a horizontal position in the water when the artificial fish lure or bait is at rest in the water. For instance, the centroidal point of the artificial fish lure shown in Figures 1 to 4 inclusive will be located only a slight distance rearwardly of the center of the bait and the artificial fish lure or bait will assume a position when at rest in which the head is slightly angled downwardly from the horizontal or water surface, while in the form of the invention shown in Figures 9 to 12 inclusive, the head portion 6" will assume a position in the water wherein it is substantially horizontal or parallel with the water surface.

Thus it will be seen that by forming the head at various angles with respect to the body portion and hence shifting the centroidal point various distances rearwardly of the center of the fish lure body, an artificial fish lure may be produced which will submerge to the desired depth when drawn through the water at a speed equivalent to a so-called trolling speed.

It will be noted that the serpentine form of the lure, as viewed in side elevation, is characterized by three distinct bends alternately in opposite directions so that the intermediate portion 7 is bent inwardly re-entrant of the angle formed by the axes of the head and tail portions of the device.

In operation, the hook portions of the artificial fish lure shown in the several forms of the invention are baited with bacon rind or the like and the leader of the fish line is attached to the screw eye 16—16'—16", by a suitable swivel connection or other fastening means. If it is desired to use the artificial fish lure for still fishing, the same is cast into the water in the usual manner. Also, when it is desired to troll, with the artificial fish lure, the same is cast into the water and drawn therethrough at a relatively slow rate of speed. When the artificial fish lure is thus propelled through the water, it will submerge a distance depending upon the particular angularity between the head and body portion. When drawn through the water during trolling, the body portion will travel along a vertical zig-zag path in short to and fro movements, thus attracting the fish and increasing the catch of the fisherman.

It is to be understood, that the various forms of the invention are to be taken as preferred embodiments thereof and that various changes in the size, arrangement and shape of the relative parts may be resorted to without departing from the spirit of the invention or the scope of the subjoined claims.

What I claim is:

1. An artificial lure comprising a head portion, an intermediate body portion, and a tail portion formed integral with one another, said lure being of a serpentine form characterized by three distinct bends in side elevation and of a substantially straight tapered contour when viewed from the top, the said head portion of said lure being provided with a flattened surface presented in an acute angular forward direction of the longitudinal axis of the intermediate body portion of the lure.

2. An artificial lure comprising a head portion, an intermediate body portion, and a tail portion formed integral with one another, said lure being of a serpentine form characterized by three distinct bends in side elevation and of a substantially straight tapered contour when viewed from the top, the said head portion and the said tail portion extending along axes substantially at right angles to one another, the said head portion of said lure being provided with a flattened surface presented in an angular forward direction of the lure.

3. An artificial lure comprising a head portion, an intermediate body portion, and a tail portion formed integral with one another, said lure being serpentine in side elevation and of a substantially straight tapered contour when viewed from the top, the said head portion and the said tail portion extending along axes substantially at right angles to one another, the intermediate portion being bent inwardly re-entrant of the angle formed by said axes, the said head portion of said lure being provided with a flattened surface presented in an angular forward direction.

FRANK F. BESSINGER.

REFERENCES CITED

The following references are of record in the file of this patent:

UNITED STATES PATENTS

| Number | Name | Date |
| --- | --- | --- |
| 1,140,279 | Myers | May 18, 1915 |
| 1,204,204 | Strube | Nov. 7, 1916 |
| 1,332,306 | Rush | Mar. 2, 1920 |
| 2,184,031 | Wyatt | Dec. 19, 1939 |
| 2,270,488 | Withey | Jan. 20, 1942 |
| 2,456,705 | Herring | Dec. 21, 1948 |